United States Patent
Siefken et al.

(10) Patent No.: US 11,328,278 B2
(45) Date of Patent: May 10, 2022

(54) POINT OF SALE TERMINAL SYSTEM AND MULTI TERMINAL NETWORK

(71) Applicant: XENIAL, INC., Charlotte, NC (US)

(72) Inventors: Christopher Paul Siefken, Charlotte, NC (US); Mahesh Kommareddi, Charlotte, NC (US); Brian Keith Jackson, Waxhaw, NC (US)

(73) Assignee: XENIAL, INC., Charlotte, NC (US)

( * ) Notice: Subject to any disclaimer, the term of this patent is extended or adjusted under 35 U.S.C. 154(b) by 0 days.

(21) Appl. No.: 16/023,188

(22) Filed: Jun. 29, 2018

(65) Prior Publication Data

US 2020/0005267 A1 Jan. 2, 2020

(51) Int. Cl.
*G06Q 20/20* (2012.01)
*G06Q 10/10* (2012.01)
*G06Q 40/00* (2012.01)

(52) U.S. Cl.
CPC ....... *G06Q 20/202* (2013.01); *G06Q 10/1091* (2013.01); *G06Q 40/10* (2013.01); *G06Q 40/12* (2013.12)

(58) Field of Classification Search
CPC .. G06Q 20/202; G06Q 10/1091; G06Q 40/10; G06Q 40/12
USPC ............................................. 705/21, 16, 30
See application file for complete search history.

(56) References Cited

U.S. PATENT DOCUMENTS

| | | | |
|---|---|---|---|
| 2017/0236121 A1 | 8/2017 | Lyons et al. | |
| 2017/0243241 A1 | 8/2017 | Bautelle et al. | |
| 2017/0352012 A1* | 12/2017 | Hearn | G06Q 20/065 |
| 2017/0364936 A1 | 12/2017 | Balfour et al. | |
| 2017/0366516 A1* | 12/2017 | Pattanaik | H04L 63/0428 |
| 2018/0025365 A1* | 1/2018 | Wilkinson | G06Q 10/08 705/7.29 |
| 2018/0101906 A1* | 4/2018 | McDonald | G06Q 40/04 |
| 2018/0144412 A1* | 5/2018 | Chenard | G06Q 40/12 |
| 2018/0150816 A1* | 5/2018 | Liu | G06Q 20/202 |
| 2018/0150865 A1 | 5/2018 | Arora | |
| 2018/0189781 A1* | 7/2018 | McCann | G06Q 20/382 |

(Continued)

FOREIGN PATENT DOCUMENTS

| | | |
|---|---|---|
| CN | 107944861 A | 4/2018 |
| WO | WO 2017/136956 A1 | 8/2017 |

(Continued)

OTHER PUBLICATIONS

Hu Bo et al., A Robust Retail POS System Based on Blockchain and Edge Computing, International Conference on Computer Analysis of Images and Patterns, Jun. 16, 2018, pp. 99-110.

(Continued)

*Primary Examiner* — Florian M Zeender
*Assistant Examiner* — Christopher R Buchanan
(74) *Attorney, Agent, or Firm* — Foley & Lardner LLP (57) ABSTRACT

A point-of-sale terminal is provided. The point-of-sale terminal includes a processor and a memory configured to store transaction data therein. The point-of-sale terminal further includes a network interface configured to connect to a computing network. The network interface is further configured to receive, from the network, a message comprising blockchain information. The point-of-sale terminal is configured to store the transaction data in a blockchain ledger.

14 Claims, 9 Drawing Sheets

(56) References Cited

U.S. PATENT DOCUMENTS

2018/0198794 A1* 7/2018 Huh .................. H04L 63/10

FOREIGN PATENT DOCUMENTS

| WO | WO 2017/221052 A1 | 12/2017 |
| WO | WO 2017/223303 A1 | 12/2017 |

OTHER PUBLICATIONS

International Search Report and Written Opinion, PCT/US2019/039872, dated Sep. 9, 2019, 11 pages.
International Preliminary Report on Patentability, PCT/US2019/039872, dated Jan. 7, 2021, 7 pages.

* cited by examiner

```
{ ... Initial object state for transaction collection,
    transaction_chain: {
        chain_index: 0,
        txn: {
            type: "TRANSACTION"/"PUNCH"/"DRAWER",
            value: 1.11/"12:50-500"/"CASH VALUE"
        },
        previous_hash: null,
        current_transaction_hash: <hash>
        business_date, customer_id, terminal_id,
        previous_hash, stringified_object
    }
}
```

FIG. 7

```
{ ... Initial object state for transaction collection
(genesis block),
    transaction_chain: {
        chain_index: 0,
        txn: {
            type: "TRANSACTION"/"PUNCH"/"DRAWER",
            value: 1.11/"12:50-500"/"CASH VALUE"
        },
        previous_hash: null,
        current_transaction_hash: "eg...1"
        business_date, customer_id,
        terminal_id, previous_hash,
        stringified_object
    }
}
```

```
{ ... Initial object state for transaction
collection,
    transaction_chain: {
        chain_index: 1,
        txn: {
            type: "TRANSACTION"/"PUNCH"/"DRAWER",
            value: 1.11/"12:50-500"/"CASH VALUE"
        },
        previous_hash: "eg...1",
        current_transaction_hash: "eg...2"
        business_date, customer_id,
        terminal_id, previous_hash,
        stringified_object
    }
}
```

POINT OF SALE TERMINAL SYSTEM AND MULTI TERMINAL NETWORK

FIELD

The present disclosure relates generally to the field of point-of-sale systems.

SUMMARY

Certain work environments are rich in opportunities for tampering or even fraud by employees and other parties. For example, at a bar or restaurant, there are multiple opportunities for tampering or theft at a cash register or other point-of-sale (POS) systems. Improper actions such as tampering or fraudulent activity by employees can affect a business's revenue stream significantly.

Typical approaches for dealing with fraud may include surveillance and after-the-fact measures such as auditing or forensic accounting. For example, the owner of a store with a traditional cash register may need to hire a specialist or take extra time to evaluate the cash register's usage history. Cash registers often include a non-alterable counter that counts the number of times a button known as a "Z-out" ("zero-ing out") button has been pressed, e.g., to carry out a drawer audit report ("DAR"). The "Z-out" button is pressed whenever the cash register is balanced by a user. The Z-out button is typically pressed at the end of the user's shift or at the end of the business day. Whenever the Z-out button is pressed, the cash register updates the non-resettable total corresponding to the cumulative monetary value of transactions for the register, which cannot be changed by the user.

Examining the Z-out counter is an example of an after-the-fact approach that is performed after fraudulent activity may have already taken place. Such approaches may also be applied to systems that store payroll information and can help with tax compliance. Further, such approaches may require significant expenditures and investment in labor and equipment. Also, such approaches may not be performed until well after the fraudulent activity has occurred, making it difficult to detect and recover lost revenue.

Existing systems are often susceptible to employee fraud that may be perpetrated during particular commercial transactions involving an employee. For example, transactions may not be fully or correctly recorded, or may be modified, deleted, or otherwise changed during periods of system downtime and/or during periods without Internet connectivity (e.g., WiFi connectivity). Employees may take advantage of downtime or lost connectivity to exploit such systems. Fraud may also be carried out by an employee when the employee improperly alters or manipulates an electronic resource or system with accounting or human resource (HR) information relating to that employee.

Exemplary embodiments disclosed herein reduce the risk of fraud by implementing blockchain-based procedures including, but not limited to, transactions related to the purchase of goods and/or services, drawer sessions associated with point-of-sale (POS) transactions, 'time punches' to record commencement and stopping of an employee's time worked, and deposits of funds.

In at least one embodiment, a plurality of transactions which originate from a terminal are signed with a unique hash ID of a previous transaction and stored in a ledger. Any discrepancy in the chain may be readily traceable, and allows for fraud mitigation by failing to log certain financial operations. Further, the risk of invalid or improper transactions is lowered. The risk is lowered because a public key is needed for a digital signature, in order to validate trust between an author and editing parties. An application program interface (API) encompassing digital signature certification may be used to handle validation. The resulting ledger is stored in a cloud, i.e., a cloud computing network, and on any terminal within the chain, thus allowing transaction data to be available to parties having appropriate access rights. Further, the public key is needed for subsequent additions to the ledger. As a whole, certain embodiments allow for complete and verifiable databases to be created for sale transactions, drawer sessions, deposits and time punches across an enterprise.

According to at least one embodiment, a point-of-sale terminal is provided. The point-of-sale terminal includes a processor and a memory configured to store transaction data therein. The point-of-sale terminal further includes a network interface configured to connect to a computing network. The network interface is further configured to receive, from the network, a message comprising blockchain information. The point-of-sale terminal is configured to store the transaction data in a blockchain ledger.

According to at least another embodiment, a non-transitory computer readable medium is provided. The medium is configured to store instructions which, when executed, cause a processor to perform certain operations. The operations include communicating with at least one point-of-sale terminal remotely connected to the processor and receiving, from the at least one point-of-sale terminal, a message comprising a unique identifier for a blockchain. The operations still further include authenticating the message received from the at least one point-of-sale terminal and recording transaction information in a blockchain ledger.

According to yet another embodiment, a POS system includes a first database configured to store a plurality of transaction entries in a blockchain. The entries include at least a transaction identifier and a record of a transaction received from one of a plurality of point-of-sale terminals. The POS system further includes a network interface configured to receive a transaction message, the transaction message including a plurality of message components including unique blockchain information. The POS system additionally includes a processor configured to identify information stored in the first database and cause a record to be created, the record including data relating to the transaction message and the transaction.

BRIEF DESCRIPTION OF THE DRAWINGS

The details of one or more embodiments are set forth in the accompanying drawings and the description below. Other features, aspects, and advantages of the disclosure will become apparent from the description, the drawings, and the claims. In the drawings, like reference numerals are used throughout the various views to designate like components.

It will be recognized that some or all of the figures are schematic representations for purposes of illustration. The figures are provided for the purpose of illustrating one or more embodiments with the explicit understanding that they will not be used to limit the scope or the meaning of the claims. For example, exemplary embodiments of point-of-sale (POS) systems are not limiting of the claims, nor are the embodiments themselves limited to those POS systems depicted in the figures.

DETAILED DESCRIPTION

Various exemplary implementations are described hereinafter. It should be noted that the specific implementations are not intended as an exhaustive description or as a limitation to the broader aspects discussed herein. One aspect described in conjunction with a particular implementation is not necessarily limited to that implementation and can be practiced with any other implementation(s).

Figure 1:
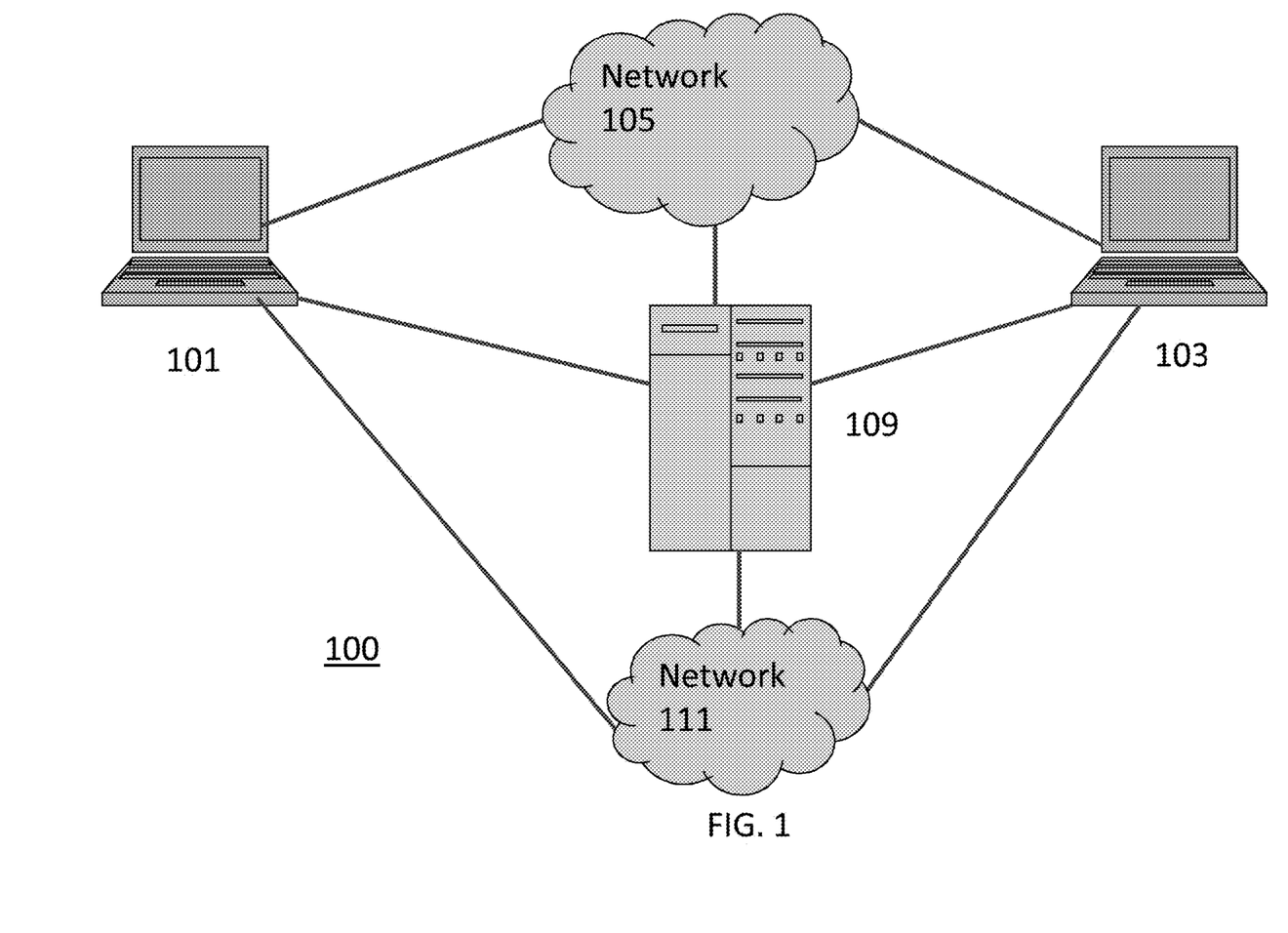
FIG. 1 is a diagram showing system architecture for managing and processing of transactions using a network in accordance with at least one embodiment.

FIG. 1 shows a system 100 to manage transactions over a network, including blockchain transactions. A blockchain is a digital ledger of transactions in which the transactions may be recorded chronologically and in a public manner. A blockchain network may be established using a plurality of computing devices, one or more of which may be configured to process and record transactions as part of a block in the blockchain. A device is, for example, a node which is configured to actively run on a network, such as a locally partitioned WAN/LAN network. After a block has completed processing of a transaction or part of a transaction, the block is added to the blockchain and the transaction record is updated. In at least one embodiment, transactions recorded in a blockchain may include provider and recipient information and a transaction amount (e.g., a sale amount in currency), such that the blockchain records a parameter associated with a specific entity, such as a sale value of a good or service purchased by an individual.

A representative computing device may be a desktop computer, a laptop, a smart phone, or a tablet, for example. The computing device may include processing circuitry and a memory storing instructions which, when executed by the processing circuitry, cause the computing device to carry out transaction processing operations as described in more detail below. The operating system that is run on one or more computing devices may be (i) Windows, developed by Microsoft Corporation of Redmond, Wash., (ii) iOS, developed by Apple, Inc. of Cupertino, Calif., (iii) Android, developed by Google, LLC of Mountain View, Calif., or (iv) an open-source Linux-based operating system, among other examples.

A blockchain is a distributed database that maintains a continuously growing list of ordered records, linked and secured using cryptography. Every block within a chain is 'signed' or validated with a unique hash code relating to a previous operation. Thus, retroactive modification or counterfeiting of prior blocks is exceedingly difficult or impossible. Blockchain technology allows multiple parties to have access to the same data without any party having complete control over such data, thus lowering possibilities for fraud.

In the system 100, a blockchain transaction may occur between the computing device of a source 101 and the computing device of a destination 103. In at least one embodiment, the source 101 may be a point-of-sale (POS) system, such as a POS terminal including a management platform residing in a cloud computing network. The cloud may receive sales data from multiple POS systems located in one location or distributed across a plurality of locations. In at least one embodiment, the source 101 may be a computer that is used to process employee labor records including 'time punches' indicating when a worker has started and ended a shift. In at least one embodiment, the source 101 may be a computing device for which a deposit is made to a financial institution. As used herein, "source" may refer to a computing device responsible for executing a sale transaction or a transaction related to labor records, and "destination" may refer to a computing device requiring access to information.

A blockchain transaction may be processed by one or more computing devices that comprise a blockchain network 105. The blockchain network 105 may receive at least a source address associated with the source 101 and a destination address associated with destination 103. When the transaction relates to a purchase of goods or services (including the return of a good, for example), the blockchain network 105 is configured to receive data relating to a value of the goods and/or services, for example. When the transaction relates to a drawer session, the blockchain network 105 is configured to receive data relating to a cumulative volume of transactions over a period of time, for example. When the transaction relates to a labor-related record, the blockchain network 105 is configured to receive data relating to an employee identity (e.g., an employee badge number and/or name) and a time period worked by that employee (e.g., a number of hours), for example. The blockchain network 105 is configured to process the transaction by generating a block that is added to a blockchain that includes a record for the transaction.

The computing device of the source 101 may be programmed to electronically "sign" the transaction request using an encryption key stored in the computing device. The electronic signature may include or otherwise be associated with an address that is generated using the encryption key. In at least one embodiment, the address may be encoded using one or more hashes. Hashes, also called hash functions or hash algorithms, include functions which correlate an input data set to an output data set, where the input value is generally computationally difficult to determine if only the output value is known. The input value may be modified to include nonce data.

The computing device of the source 101 may include a cache memory. In some embodiments, all entries are stored in a local storage of a terminal before being synced with a cloud network 111. Entries stored in the local cache before being synchronized with the cloud network 111 may be cleared if the computing device goes offline. To avoid accidental or unintentional loss of such data, signature and blockchain validation may be done regularly, and remote storage containing the ledger is protected from cache clearing. The device data, however, may be clearable, and so in some embodiments, editing of data stored in the local cache may be limited using key encryption. In some embodiments, validation of signatures and chains occurs in the cloud network 111 and/or terminals. An updater service may be used for monitoring of connections to avoid deletion of locally stored entries prior to transmittal to the cloud. For example, the updater service may check whether a ledger was deleted and whether there were periods (e.g., hours or days) without a connection.

The network 111 may be a cloud network of multiple POS terminals and the source 101 may be a terminal that is connected to the cloud network 111. The network 111 may be configured to process transactions using methods and systems in a secure manner, as discussed in more detail below. In the system 100, the network 111 may also include at least one first server 109. The server 109 may be configured to authorize transactions using the network 111. Further, the server 109 may be configured to link blockchain transactions with validated entities (e.g., known and verified individuals or POS terminals). Each terminal may have communication architecture for a network interface, such as a network interface card or network interface circuitry, so as to connect to the network 111. Additional servers may also be included in the network, such that multiple servers may be in communication with multiple terminals. For ease of review, the system shown in FIG. 1 is shown with all components being connected to network 111, as would be the case during full connectivity of system components. However, it should be understood that the system may not have perfect (100%) uptime and that there may be periods of disconnectivity between connected APIs and one or more terminals.

Order transactions may be linked as follows, according to certain embodiments. An order ID is generated with metadata (i.e., within the transaction ID) when an item is initially selected at a first one of the POS terminals (e.g., POS1). In at least one embodiment, POS1 is a first terminal for transactions at a bar within a facility such as a restaurant, for example, and POS2 is a second terminal for transactions at a table within that same restaurant. The order ID is stored as a string value, and is referenceable to a main server/cloud connection (e.g., server 109 and network 111). The order ID may be linked with another order ID when another item is later selected at POS2.

The cloud network 111 may be a network of terminals in a specific store or a chain of stores, e.g., a chain of eateries. The cloud network 111 may be a distributed system in which each of the terminals in the cloud network 111 and/or each transaction conducted at such terminals has specific unique identifying account information, including but not limited to a terminal ID, a customer ID, and a business date, among other things. Information relating to the terminals may be processed (e.g., collected, analyzed, and reported) on the basis of time increments that may be associated with a defined temporal period (e.g., a business day). The transaction chain may be represented as a stringified object. Further, the current transaction may include addressable blocks (e.g., block 0 or the 'genesis block' being an entry point corresponding to a zero entry in a blockchain database). In at least one embodiment, cloud network 111 may be a network established at the entity-level, e.g., for a corporation having numerous computing systems as discrete nodes that transmit data to a cloud-based server.

The destination 103 may be associated with an enterprise, including but not limited to a manager of platforms for restaurants and other businesses, or a financial instruction. In at least one embodiment, the destination 103 is a computing system of an enterprise. In at least one embodiment, the destination 103 may be associated with a computing system of an employer, such as a computing system used to keep track of payroll and accounting functions, or a financial institution.

In at least one embodiment, the source 101 may conduct a blockchain transaction with the destination 103. For example, the destination 103 may provide a destination address (e.g., corresponding to a terminal ID) for receipt of payment in money for goods and/or services. The destination address may be created using an encryption key stored in the computing device of the destination 103. In at least one embodiment, the encryption key may be one key of a pair of keys. For example, the encryption key may be a public key corresponding to a private key stored in the computing device of a specific POS in network 111. A transaction request may be initiated by the source 101 for payment of a specified amount to the destination address provided by the destination 103. For example, the transaction request may be sent to the server 109 via the network 111.

Figure 9:
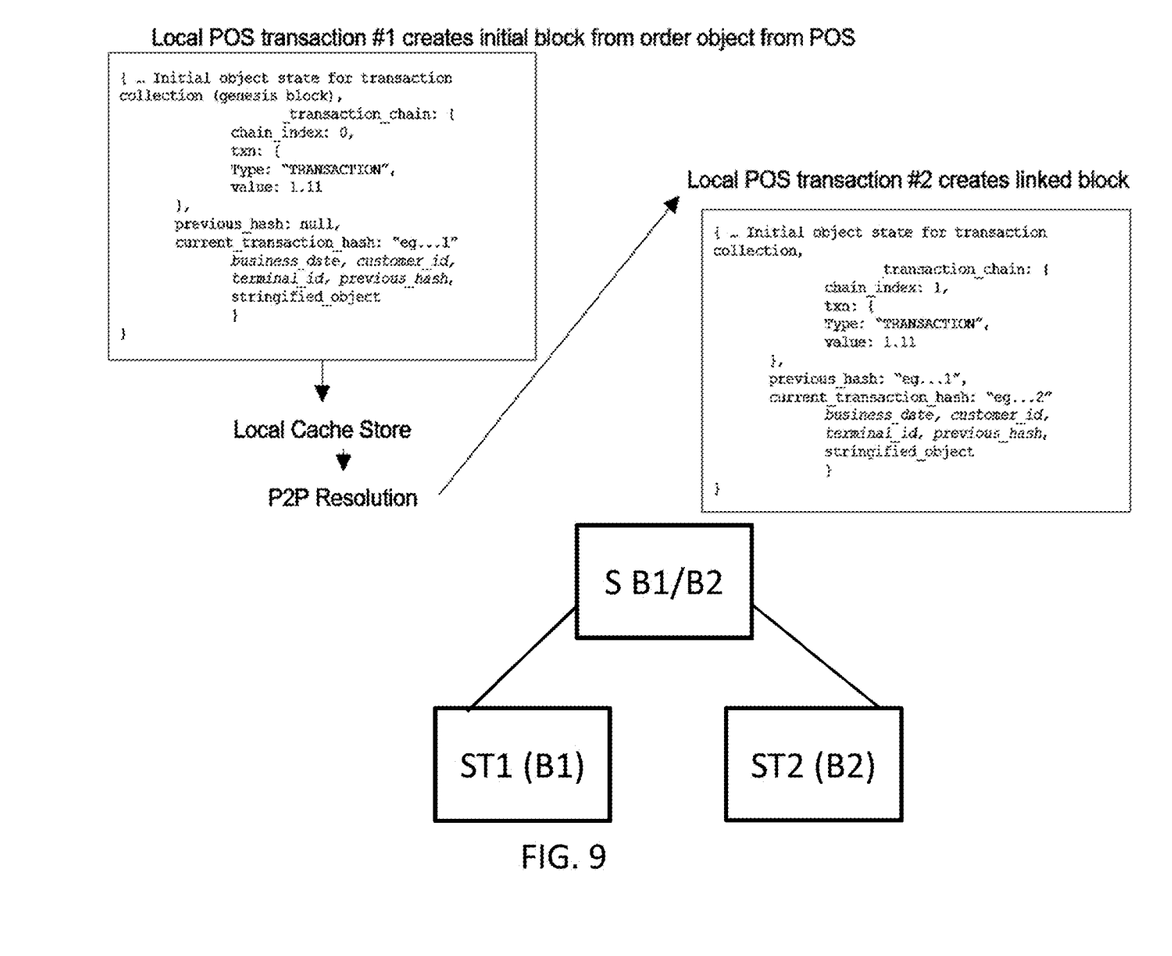
FIG. 9 shows an exemplary transaction process in accordance with at least one embodiment.

FIG. 9 shows an exemplary transaction process in accordance with at least one embodiment. Speaking generally, the process shown in FIG. 9 may include the following operations. The process includes the steps of creating a block and storing the block locally. Following block creation and local storage, the process further includes engaging in a transaction (e.g., a peer-to-peer (P2P) transaction) involving the block, using a POS terminal, and then linking the block to a chain. The data shown in FIG. 9 includes metadata relating to the transaction (e.g., a transaction type). As shown in FIG. 9, each transaction, upon creation, is stored in a local cache store (e.g., a block B1 is stored in a first store ST1, and a block B2 is stored in a second store ST2), and then sent to the network 111 for peer-to-peer (P2P) resolution. For example, the server S receives data relating to blocks B1 and B2 via the network. The hash of the transaction then becomes the reference for one or more new transactions within the chain.

In FIG. 9, "txn" is a transaction type, denoting the category of transaction, with the type being a generic holder for an actionable field that may be populated based on a look-up from the API. The "value: 1.11" indicates the transaction amount that is a basic data type, corresponding to stored information associated with the transaction type. The transaction type may be, for example, a drawer open/close, a time clock, an order entry time, a tender, or a transaction resolution. The value information may be, for example, a payment/order creation value (XX:XXZ) or a clock in/out time (XX:XXZ). The blockchain itself may be stored in the POS terminals connected via the network.

In at least one embodiment, the transaction request may be in the form of a transaction message that is sent to the server 109. In at least one embodiment, the server 109 may receive the transaction request and then create a next transaction message. The transaction message may include a plurality of message components. For example, the message components may include a transaction amount, an amount of hours worked, an amount of funds to be deposited, a transaction volume for a drawer session, a price of a sales good, and a length of a drawer session. The transaction may include commands to change a price of an item (e.g., a consumable good). In at least one embodiment, an interim chain may be stored on the local POS, e.g., in local permanent storage, in encrypted files. The actual full blockchain, by contrast, is stored on server 109. In certain other embodiments, the full blockchain is stored on one or more terminals.

In addition, in at least one embodiment, the transaction message may include a private message component that includes data associated with a specific blockchain transaction. By way of example, the private message component may include, but is not limited to, a POS identifier (a terminal identifier), a franchise identifier, an employee identifier, a network identifier, a transaction amount, and an address identifier. The network identifier may be associated with network 105 and/or the cloud network 111 containing a plurality of POS devices (each of which is an individual computing device or node). In at least one embodiment, the network identifier may be employed by the server 109 to identify the network 105 to transmit data relating to one or more blockchain transactions. All connected nodes during a time of activation (e.g., when an application is installed and a wireless or wired connection to a local network is initialized) may be configured to store each terminal's block in the form of a unique identifier, so that the block data is accessible through connected devices.

As mentioned above, in at least one embodiment, a message component may include a transaction amount. The transaction amount may correspond to an amount of currency (e.g., traditional fiat currency, cryptocurrency, or a combination thereof) being transferred as per the transaction. In at least one embodiment, the transaction amount may correspond to an amount of funds provided in exchange for one or more food items and/or beverages. For example, the transaction amount may correspond to a customer's dinner order for an entrée and a drink, including the sales price of each item and its applicable tax, and a gratuity amount. In at least one embodiment, the transaction amount reflects a total amount of money associated with a volume of multiple individual sales transactions over a period of time, for example, over a full business day at facility such as an eatery, from the morning until the close of business at night. Further, in at least one embodiment, the address identifier may be the destination address for the blockchain provided by source 101 and/or destination 103 using a public key associated with destination 103. In at least one embodiment, the address identifier may be replaced with or supplemented by the public key. The address identifier itself may be encoded using one or more hashes.

In at least one embodiment, the private message component in the transaction message may include additional information relevant to the source 101. The information may include a transaction records associated with one or more prior blockchain transactions. More specifically, the information includes a transaction record for a 'genesis block' corresponding to the block of the first transaction of the day for a particular POS, together with any subsequent blocks for subsequent transactions. The initial or genesis block is unique in that it does not refer to any prior block. In contrast, all subsequent blocks reference all prior blocks in the form of a hash reference. In addition, the information may further include a public key associated with the source 101 and an authenticator. The authenticator may be an electronic signature that is generated using a private key to verify information associated with the transaction identifier. For example, an installer may perform an authentication step by confirming that the POS has a security token (e.g., in a 'handshake' process). By way of further example, the authentication may be provided by a device (e.g., a terminal) ID with a franchisee's ID, as a form of paired logging against a private key interface.

Figure 10:
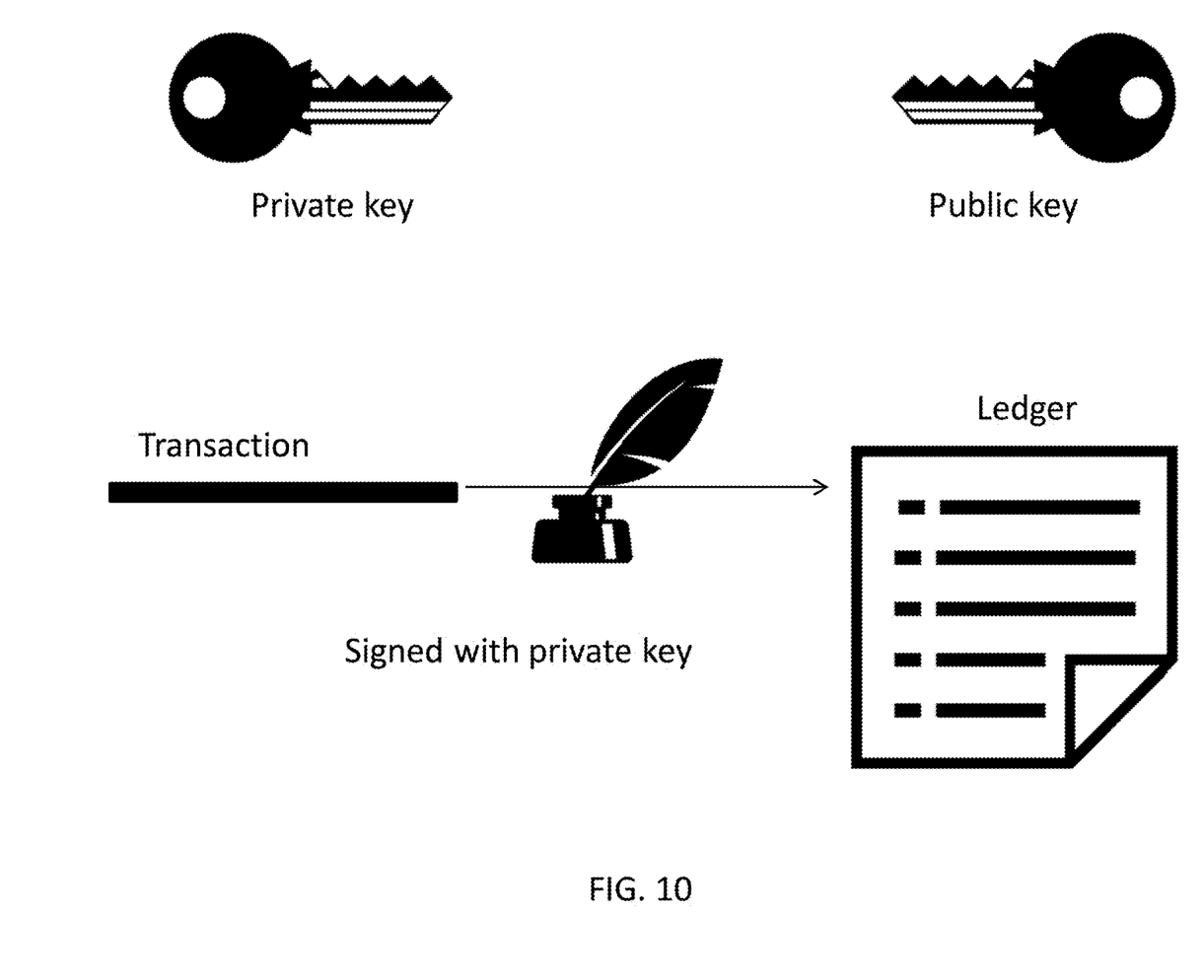
FIG. 10 shows an exemplary signature process in accordance with at least one embodiment.

In at least one embodiment, as shown in FIG. 10, every entry on the blockchain is signed with a private key of an originating terminal. This helps to ensure that entries in the blockchain are valid, for any given POS system in network 111. Each POS may have a private key stored in a centralized location and generated at install. The transaction is signed with the terminal's private key and sent to the public ledger using a public key for access. Entries which are added to the ledger are added with the digital signature being applied.

In at least one embodiment, the transaction message may be sent to the server 109 by the source 101. In other instances, the destination 103 may provide the transaction information to the cloud network 111 containing multiple POS devices, which may send the transaction message to the server 109. After the transaction message is received by the server 109, the server 109 may then process a blockchain transaction using the network 105 based on the information included in the private message component, such as an order ID number. In at least one embodiment, the server 109 may provide the transaction message or data included therein to the source 101, which may initiate the blockchain transaction. Alternatively, the blockchain transaction may be initiated by the server 109 itself.

In at least one or more embodiments, the network 111 and terminals therein may be configured such that a sales transaction is processed via the blockchain and respectively includes activities at multiple terminals. For example, at a first terminal, a customer may order a beverage (e.g., at a bar), and may later order a meal at a second terminal. The network 111 may access information related to both discrete ordering activities and link or combine the two orders as part of a consolidated transaction.

In at least one embodiment, the network 111 is configured to communicate with individual POS terminals therein such that complete replication of data on a plurality of terminals is effectuated. By implementing peer-to-peer communication, a common set of data may be shared between POS terminals at any given site. The blockchain stores a fingerprint (a blockchain entity) which uniquely identifies the ledger, the chain index, and the current hash associated with a transaction. More particularly, each fingerprint is broadcast by each node (e.g., individual terminal) in the blockchain, together with a node identifier and node address. Each node receiving the broadcast compares the broadcast fingerprint (entity) to the blockchain entity stored by that node. Any discrepancy or mismatch between the stored entity and the broadcast entity requires the node to request an updated entity from the broadcasting node via the node address. Each node then validates the received entity and attempts to resolve any conflicts. After conflict resolution and validation, the node stores the updated blockchain, such that all nodes are updated with the current blockchain.

In at least one embodiment, the cloud network 111 and/or server 109 may store one or more private keys associated with source 101 and/or destination 103. For example, the private key may be stored such that cloud network 111 and/or server 109 may initiate blockchain transactions. In at least one embodiment, the server 109 may be further configured to associate blockchain transactions with one or more entities or accounts. For example, the server 109 may store account information for transaction accounts associated with the source 101. The server 109 may then correlate blockchain transactions with the stored account information using the identifiers and information in received transaction messages. In this manner, the server 109 may store transaction records for a historical period, such as a day's worth of transaction records, so as to act as a financial record.

Accordingly, it would be difficult or impossible for a franchisee to falsify transaction records because the falsified records would not be reconciled by the blockchain. Thus, the above-disclosed system serves to increase the robustness and integrity of transaction records, with the ledger serving effectively as a log with a non-resettable total. Further, in at least one embodiment, metadata associated with fraud protection may log the value of a transaction or activity in a ledger. Such metadata may be stored until a set number of days is reached (e.g., 30 days) if a terminal is unable to connect to the cloud computing network 111. After the set number of days is reached, there is sufficient time to submit data and reconnect, for analyzing by a reporting program (e.g., so a franchisee or company owner may review records and events for signs of fraud).

In at least one embodiment, a first POS (a source 101) creates a first transaction that is the initial block (the genesis block) based on a transaction at that POS. Information relating to the transaction is sent to a local cache store (e.g., a memory of the POS). A peer-to-peer name resolution protocol (PNRP) may be employed to allow a cloud network to establish a peer-to-peer connection with the local cache memory so as to retrieve the stored first transaction information. The hash of this first transaction becomes the reference for subsequent transactions. In at least one embodiment, the peer name associated with the local device is identified by a secure hash of an associated public key. New cache entries may be acquired by the network (e.g., network 111). The first POS may then be used to execute a second transaction. The second transaction may be used to create a linked block, thus forming the second block of the blockchain associated with the transactions over a specified time period (e.g., a business day or a work shift) for a particular POS device or a worker using the POS device.

Figure 5:
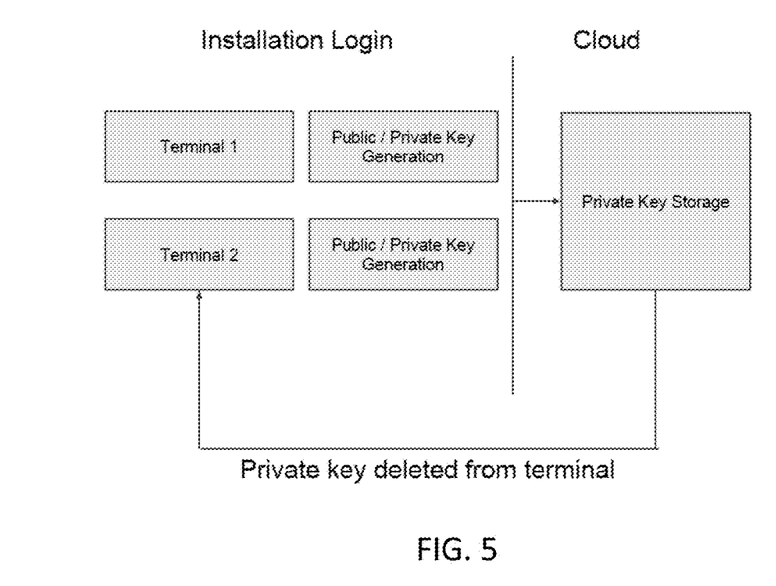
FIG. 5 is a diagram showing a process for making a record associated with a transaction message in accordance with at least one embodiment.

FIG. 5 is a diagram showing a process for making a record associated with a transaction message in accordance with at least one embodiment. As indicated above, multiple POS devices (terminals) may be connected via network 111. Data relating to transactions at each terminal is sent to the network 111. FIG. 5 depicts the installation of a POS application on a first terminal, which then generates a public/private key. The private key is stored on the PKI (e.g., via a cloud or certificate authority). Thus, the cloud (or a server) acts as a record keeper for private keys generated at a terminal, helping to prevent file theft from a specific terminal. Once storage is complete, the private key may be erased from the generating terminal. In at least one embodiment, the private key is stored in the network 111 itself, and may be deleted from the individual terminals after information from the terminals is uploaded to the network. In particular, the record created according to the process shown in FIG. 5 may be a record in a key value database on a device, which serves as a blockchain database.

Figure 6:
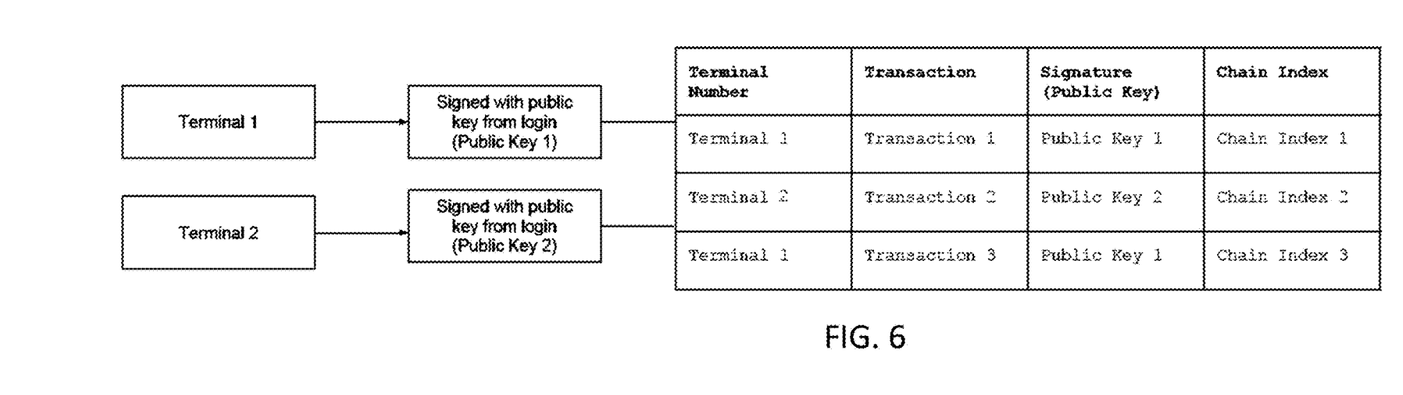
FIG. 6 is a diagram showing a ledger in accordance with at least one embodiment.

FIG. 6 is a diagram showing a ledger in accordance with at least one embodiment. As described above, the cloud network 111 may be configured to receive data from multiple POS terminals therein. In at least one embodiment, data from a first terminal (Terminal 1) and a second Terminal (Terminal 2) may be transmitted via server 109 to network 111. The blockchain transactions are stored in a memory of server 109 in a ledger. For example, as shown in FIG. 6, an exemplary ledger may include a record of a terminal ID, a transaction number, a public key, and a chain index. The chain index is the point connecting between blocks (i.e., the 'chain link') and is zeroed upon a new chain operation.

Figure 7:
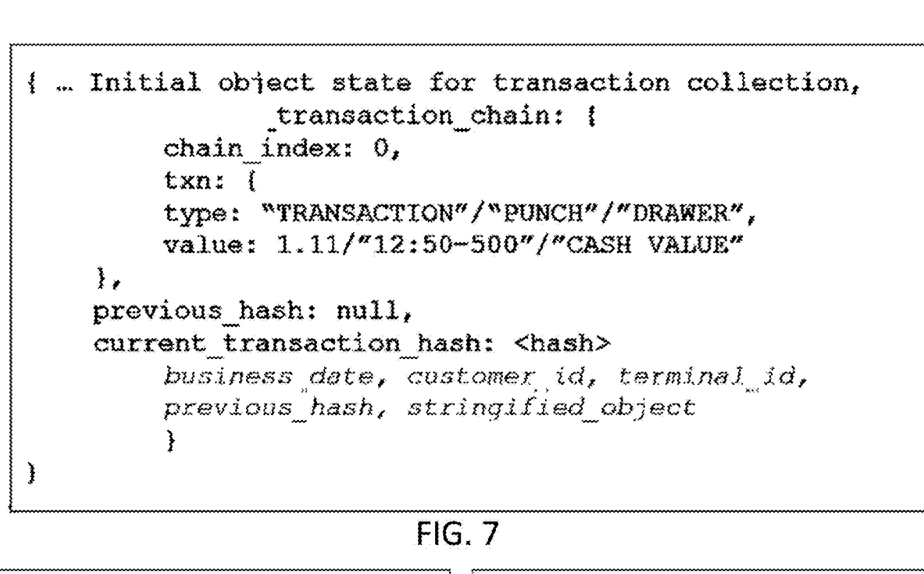
FIG. 7 shows a block in accordance with at least one embodiment.
Figure 8:
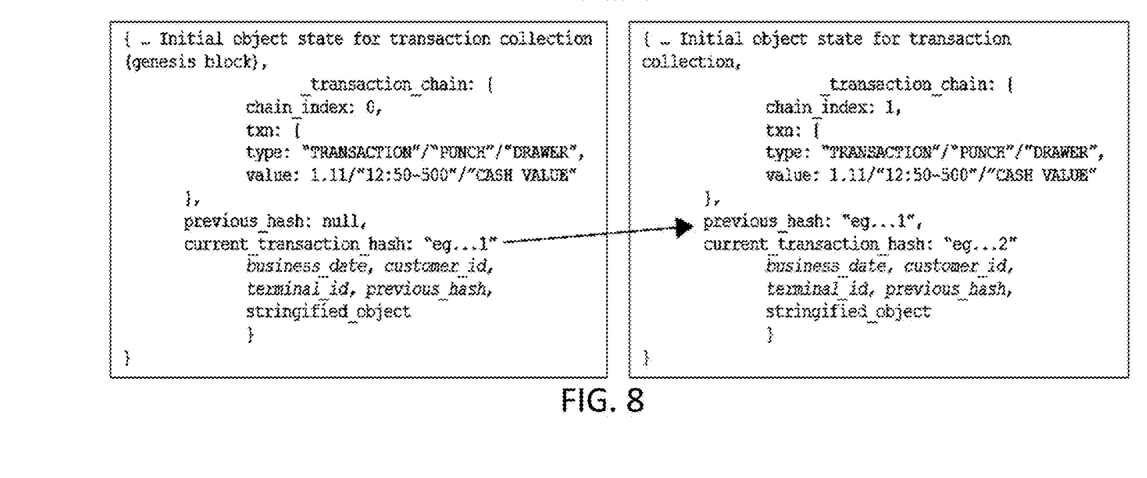
FIG. 8 shows a blockchain in accordance with at least one embodiment.

The exemplary ledger is a 'general ledger' in that it includes information relating to multiple terminals throughout an enterprise. Detailed examples of blocks of FIG. 6 are set forth in FIGS. 7-9. As discussed above, a blockchain ledger serves as a database that maintains a secure, unalterable list of linked records, such as POS terminal transactions. Because of the secure and unalterable nature of the blockchain, tampering and fraud are mitigated or prevented. For example, imposters cannot add to or modify the chain.

Figure 2:
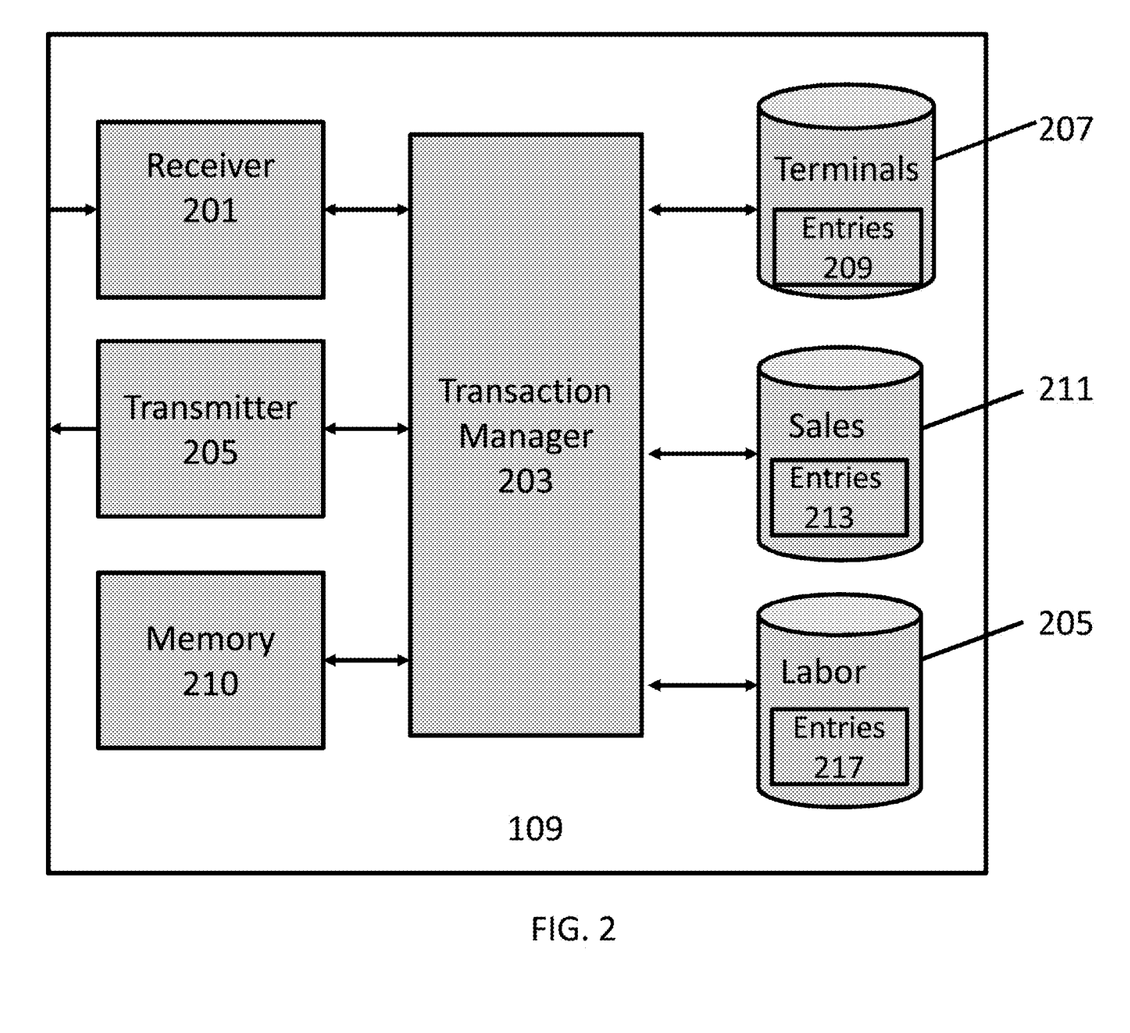
FIG. 2 is a diagram showing a server of FIG. 1 for handling one or more interactions from one or more receivers, in accordance with at least one embodiment.

FIG. 2 shows server 109 of the system 100 according to at least one embodiment. In at least one embodiment, the server 109 may include a memory 210. The memory 210 may be configured to store data utilized by server 109 including hash codes and rules for blockchain network data, or the like. The server 109 may include a receiver 201. The receiver 201 may be configured to receive data over one or more networks via one or more network protocols. The receiver 201 may be configured to receive transaction messages from cloud network 111 or directly from source 101. The receiver 201 may receive transaction requests from source 101, destination 103, and/or cloud network 111. In at least one embodiment, receiver 201 is programmed to receive account information and/or entries for sales transactions, which may include monetary amounts.

The server 109 may also include a processor that serves as a transaction manager 203. In at least one embodiment, transaction manager 203 may be a processor configured to execute program instructions to cause server 109 to carry out specified functions discussed herein. For example, when a request for a transaction is received by the receiver 201, the processor 203 may parse data included in the transaction request and create a transaction message based on such data. The instructions may be stored in a non-transitory medium such as a memory provided with the processor of server 109.

In at least one embodiment, the processor 203 may cause a transaction message to be created which includes a plurality of transaction components. The components may include a transaction amount and a private component. The processor 203 may be configured to store a historical value indicating the total value of the sales transactions over a specified time period as part of the private component, and may further include other encoded values.

In at least one embodiment, server 109 may also include a transmitter 205. The transmitter 205 may be configured to transmit data over one or more networks via one or more communication protocols. The transmitter 205 may transmit data requests to the cloud network 111, for example. The transmitter 205 may send transaction messages to cloud network 111 using the network 105. In at least one embodiment, the transmitter 205 may also transmit blockchain transaction requests to network 105 using data received by the receiver 201 for use in blockchain transactions. In at least one embodiment, the transmitter 205 may transmit a transaction message to the cloud network 111, which may approve or reject the corresponding blockchain transaction.

In at least one embodiment, the server 109 may also include or access a terminal database 207. The terminal database 207 may be configured to store a plurality of terminal entries 209. Each terminal entry 209 may include data related to a specific terminal, such as individual POS devices in network 111, to consumers who have had commercial interactions at a terminal in the network 111, and other data. One or more of the transaction entries 209 may be a unique value associated with a customer used for identification thereof, such as a transaction account number, loyalty rewards program customer number, username, e-mail address, phone number, etc.

In at least one embodiment, the receiver 201 may be further configured to receive a transaction message for a blockchain transaction. The transaction message may include a data element configured to store unique account identifying information, and a transaction amount. The processor 203 may be configured to identify a specific transaction entry 209 stored in the database 207.

In at least one embodiment, the processor (transaction manager) 203 may be further configured to link blockchain transactions with entries corresponding to terminal profiles 209 stored in the database 207 and/or entries 213 corresponding to customer profiles stored in database 211. In such an embodiment, transaction messages received by the receiver 201 for blockchain transactions may include at least a first message component for a business date, a second message component for a customer identifier, a third message component for a terminal identifier, and a fourth message component for monetary information. The message components make up the transaction chain, and hold object(s) containing events and related values (e.g., transaction and tender related information).

The receiver 201 may also receive a notification relating to a blockchain transaction processed using a network 105. Based on the information in the notification, the processor 203 may store information correlating a transaction and terminal information included in the terminal entries 209. Such information may be used in subsequent blockchain transactions involving the associated transaction account.

In at least one embodiment, the server 109 may further include or access a sales database 211. The sales database 211 may be configured to store a plurality of sales data entries 213 relating to specific sales transactions or aggregated transactions over a drawer session. One or more sales transaction data entries 213 may include data related to a payment transaction. Further, one or more of the sales transaction data entries 213 may include a transaction message, a transaction notification, a transaction amount, a transaction time, a transaction date, employee information (i.e., the name and employee identification information of an employee on duty), a source address, a destination address, and customer specific data. Furthermore, the sales database 211 may also include information relating to drawer sessions and other sales information.

In at least one embodiment, the server 109 may further include a labor database 205. The labor database 205 may be configured to store a plurality of data entries 217 relating to specific employees and the times at which they 'punch in' and 'punch out' from the workplace. One or more labor-related data entries 217 may include data related to the correlation between the times at which the worker indicated that he or she reported for duty and the time that is recorded in the database 205. One or more of the labor-related entries 217 may include employee information (i.e., the name and employee identification information of an employee on duty), a log of hours worked, and other information. By using the blockchain to keep track of 'drawer opens' and inhibiting tampering with the ledger (e.g., using hashes of events stored in the network 111), such embodiments may further prevent or lower the risk of employee or franchisee fraud.

Figure 3:
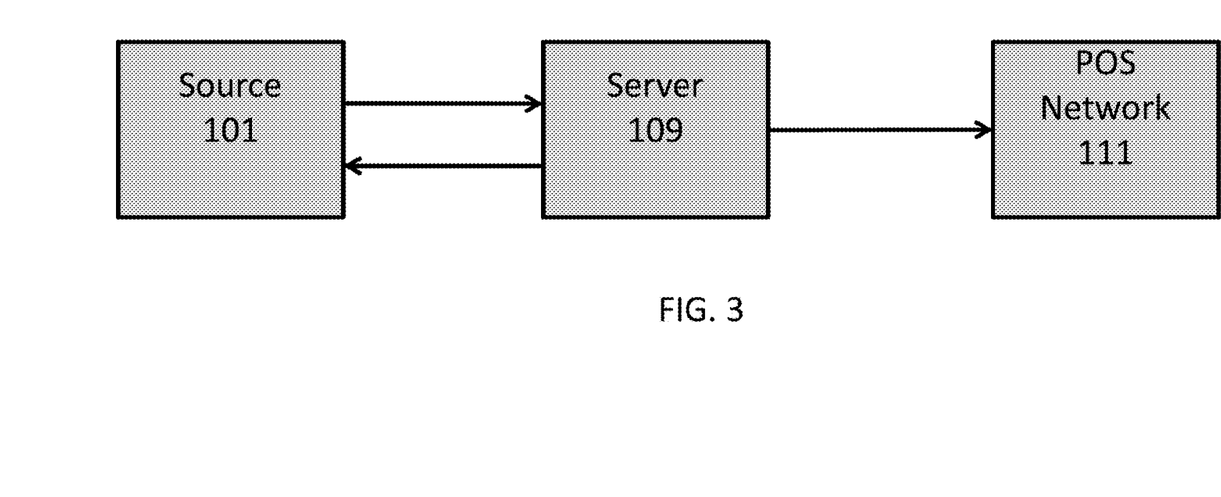
FIG. 3 is a flow diagram showing a process for authorizing a transaction in accordance with at least one embodiment.

FIG. 3 illustrates a process 300 for processing a blockchain transaction according to at least one embodiment. First, the server 109 may create a transaction message for a blockchain transaction. As described above, the transaction message may include a plurality of message components, including a private component. Second, the transmitter 205 of the server 109 may transmit the transaction message to the destination 103. The destination 103 may then receive the transaction message. Each terminal in the network 111 represents a node in the network that is a participant in the blockchain, with a unique set of identifying information. When there is a mismatch or disparity between data stored in the blockchain and data sent from any particular node, the server 109 requests updated information from the sender, and each node is configured to validate received blockchain information and resolve conflicts as appropriate.

For example, the source 101 creates an event (or a new block) which is then chained with a block sent to server 109 to be validated by network 111. For a drawer session, an event at the source 101 leads to creation of a block containing information such as time of a drawer open, an amount, a tender type, and employee/franchise information. For time punches, an event at the source 101 may create a block including, for example, information such as employee information, a clock in time, a clock out time, and franchise information. For sales, an event at the source 101 may create a block including, for example, employee information, a time of drawer open, a tender type, and franchise information. For deposits, an event at source 101 may create a block containing but not limited to employee information, a time of drawer open, a tender type, and franchise information.

Figure 11:
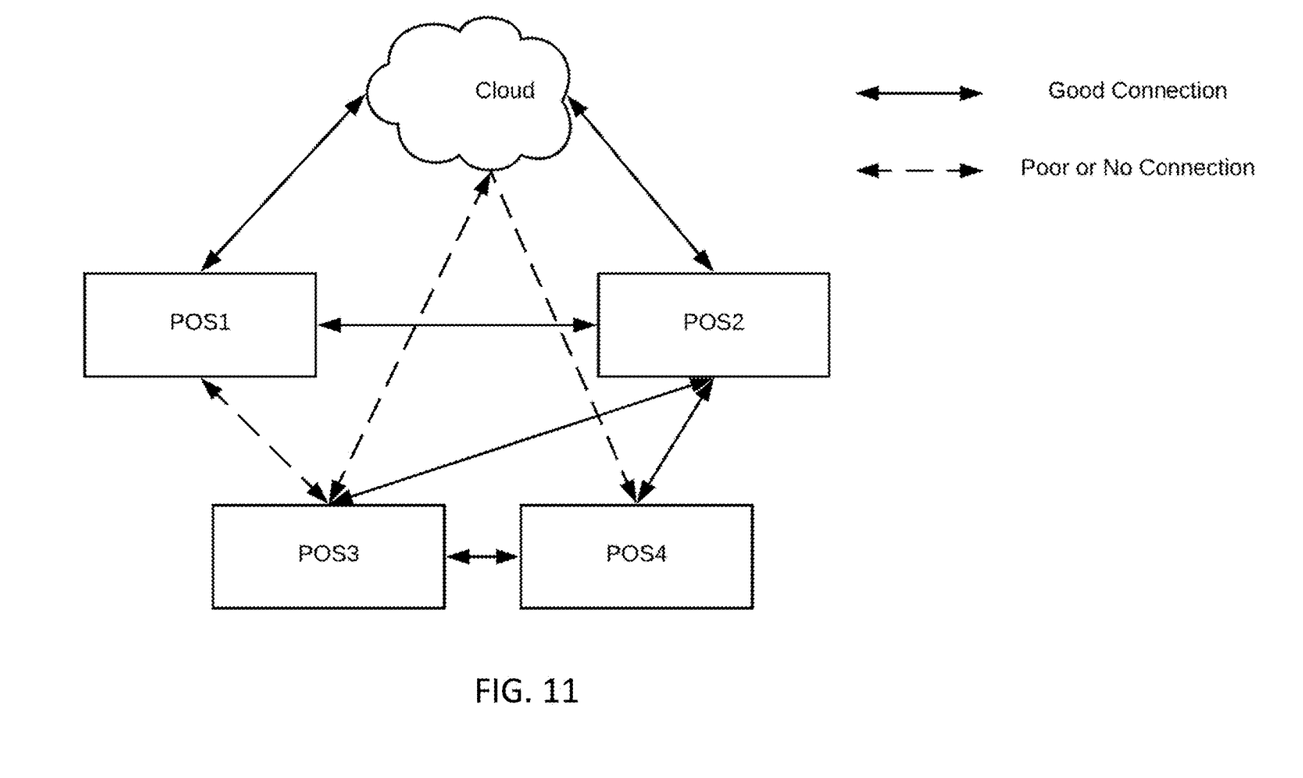
FIG. 11 shows an exemplary process in accordance with at least one embodiment.

FIG. 11 depicts a system according to at least one embodiment, including process operations during a period when connectivity is absent. More particularly, as shown in FIG. 11, a plurality of POS terminals (POS1, POS2, POS3, POS4) are connected. The processing utilizing the components described above differs when a POS is disconnected from the network and therefore not communicating with server 109, i.e., during periods of downtime. Dashed lines between the POSs indicate periods of disconnectivity or weak connectivity, whereas solid lines depict periods of sufficient connectivity to permit better communication. When a POS is disconnected from the network, processing according to at least one embodiment occurs in the following manner.

When a POS is disconnected from server 109 due to a network connectivity issue, a daily chain is created between connected destinations (e.g., POSs) until a predetermined time (e.g., a start of a business period, such as a new business day). A new chain is then created, and the old chain is archived in local permanent storage of all POSs. Such a process may be carried out in order to hold data for up to a certain number of days (e.g., thirty days) without server connectivity. Further, during a period of lost or intermittent connectivity, a backup/copy recovery program may be executed so that recovery is performed from block-to-block. The backup/copy recovery program may look for 'breaks' in the blockchain and attempt an incremental recovery (e.g., reconciling and recovery of each block until the chain is no longer broken).

In particular, in a system in which three POS devices are taken offline without the possibility of immediate reconnection, an administrative user may utilize the local stored block data in each POS to help recover the chain from the time of a connectivity failure. Also, in the case of a catastrophic network failure, without the possibility of reconnection, an export of the blockchain database with the public key may be performed. Further, a diagnostic utility may evaluate connectivity periodically and cause a backup protocol to be initiated when a lack of connectivity is determined to persist for a predetermined time period (e.g., 5 minutes, 30 minutes, 60 minutes, 1 day, etc.). Such processes may be used, for example, for up to 30 days to ensure that data for a significant business time period may be preserved even when server access is unavailable. When connectivity is restored, a reporting tool in the cloud computing network may evaluate the information collected during the system downtime for reconciliation.

Figure 4:
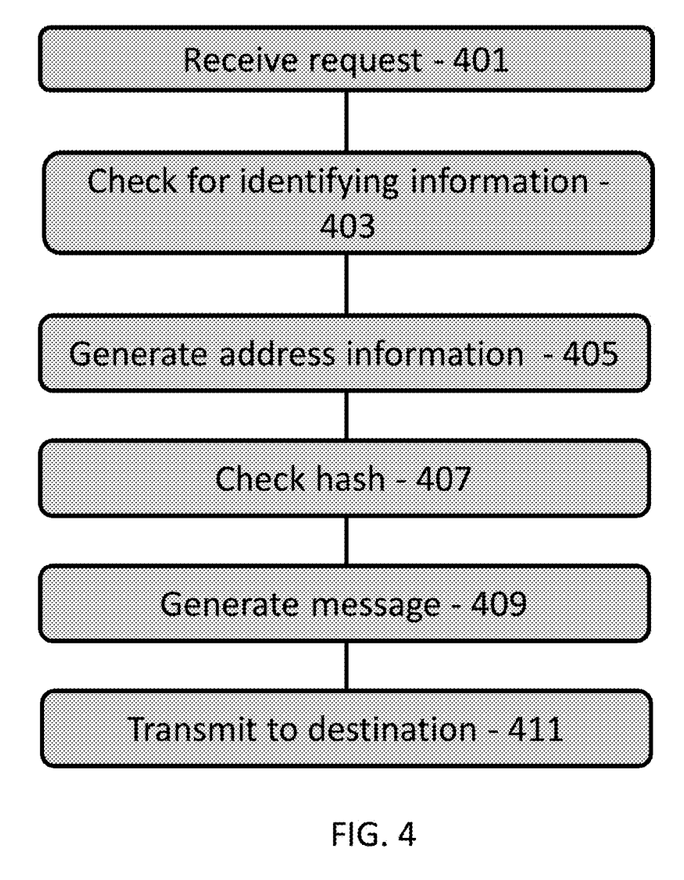
FIG. 4 is a flow diagram illustrating a process for the authorization of a blockchain transaction using the server of FIG. 2 in accordance with at least one embodiment.

FIG. 4 shows an exemplary process associated with a transaction message for a blockchain transaction carried out by the server 109 according to at least one embodiment. In step 401, receiver 201 of the server 109 may receive a transaction request, such as from the source 101. According to the process shown in FIG. 4, the databases described above may be stored on a local terminal (e.g., a local POS). The transaction request may include a network identifier associated with network 105, a transaction amount, a public key, an address identifier for a particular destination 103, and a private key associated with the source 101. Further, a transaction is signed with a private key of a terminal for authentication, and sent to a public ledger using the public key for access.

Each POS has its own ledger and a private key, and in some embodiments, the private key may be stored in a centralized location to generate entries, at installation. That is, when the private key is removed from the terminal upon sending the transaction information using the public key, the private key at the centralized location may then be used. In at least one embodiment, the private key may be stored at a single terminal with no connection to a network, or deleted at installation.

In step 403, the processor 203 of the server 109 determines whether an address identifier is included in the transaction request. When the transaction request does not include an address identifier, in step 405, the processor 203 may cause address information to be created to continue the transaction. Next, in step 407, the processor 203 may determine whether network information included in the received transaction request is hashed or encoded properly. If the network identifier is not encoded or hashed, then the process may terminate. In particular, a hashing issue detected at this stage may represent a fraudulent or improper transaction, and thus, such a transaction is not permitted to be continued.

On the other hand, if the identifying information is encoded, then at step 409, the processor 203 creates a transaction message. The transaction message may include the message components described above, including a private component. In at least one embodiment, the message component may be a current blockchain transaction amount, one or more past blockchain transaction amounts, or a terminal identifier, which may include an account identifier associated with the destination 103 (e.g., which may be the address identifier). The private component may include the encoded or hashed network identifier information, for example. In step 411, the transmitter 205 of the server 109 may transmit the transaction message to the cloud network 111. The blockchain transaction may be carried out using the data included in the transaction message.

In at least one embodiment, the server 109 of FIG. 2 may be implemented in a computer system including at least a processor and a memory, using non-transitory computer readable media having instructions stored thereon (e.g., a computer program), or a combination of such media with hardware, software, and/or firmware, or combinations thereof. In at least one embodiment, each network and the server 109 may include multiprocessor systems, minicomputers, mainframe computers, computers linked or clustered with distributed functions. The blockchain may be stored in any type of non-transitory memory. The memory may store, for example, a sales price of each item and its applicable tax for a given order, and a gratuity amount; a total amount of money associated with a volume of multiple individual sales transactions over a period of time, for example, over a full business day at an eatery, from the morning until the close of business at night; time card data; statistical data, and other types of data.

Each component of system 100 may include a processor and a computer readable medium (as may also be referred to as machine-readable media or machine-readable content). The computer readable medium may be a tangible, non-transitory computer readable storage medium storing computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

Examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. The computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by a processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on a computer, partly on the computer, as a stand-alone computer-readable package, partly on the computer and partly on a remote computer or entirely on the remote computer or server.

In at least one embodiment, a remote computer may be connected to system 100 through any type of network, including a local area network (LAN) or a wide area network (WAN), or the connection may be made to an external computer (for example, through the Internet using an Internet Service Provider). The program code may also be stored in a computer readable medium that can direct a computer, other programmable data processing apparatus, or other devices to function in a particular manner, such that the instructions stored in the computer readable medium produce an article of manufacture including instructions which implement functions and/or acts described herein.

As used herein and in the appended claims, singular articles such as "a" and "an" and "the" and similar references in the context of describing the elements (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein, is intended merely to better illuminate the implementations and does not pose a limitation on the scope of the claims unless otherwise stated. No language in the specification should be construed as indicating any non-claimed element as essential.

Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified. The expression "comprising" means "including, but not limited to." Thus, other non-mentioned components or steps may be present. Unless otherwise specified, "a" or "an" means one or more.

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations.

It is to be understood that to the extent that the present disclosure refers to certain preferred implementations, various other implementations and variants may occur to those skilled in the art, which are within the scope and spirit of the disclosure, and such other implementations and variants are intended to be covered by corresponding claims. Those skilled in the art will readily appreciate that many modifications are possible without materially departing from the novel teachings and advantages of the subject matter described herein. For example, the order or sequence of certain process or method steps may be varied or re-sequenced according to alternative embodiments. Other substitutions, modifications, changes and omissions may also be made in the design, operation and arrangement of the various exemplary embodiments without departing from the scope of the present disclosure.

What is claimed is:

1. A system including a first point-of-sale terminal, the system comprising:
   a processor and a memory configured to store transaction data therein;
   a network interface configured to connect to a computing network and configured to receive, from the network, a message comprising blockchain information,
   the first point-of-sale terminal being configured to create transaction data for an initial block of a blockchain ledger based on a first transaction at the first point-of-sale terminal and store the transaction data in the blockchain ledger, such that, upon creation, the transaction data is stored in a local cache and then sent to the network,
   the system being configured to
      synchronize transaction data between the local cache and a remote memory accessible via the network, wherein
         the synchronized transaction data includes sales data of point-of-sale transactions conducted at a plurality of point-of-sale terminals including the first point-of sale terminal and a second point-of-sale terminal, and
      link transaction information of the first transaction at the first point-of-sale terminal with transaction information of a second transaction at the second point-of-sale terminal such that the blockchain ledger includes transaction information of the first transaction and the second transaction, the first point-of-sale terminal and the second point-of-sale terminal being provided at different locations within a facility, wherein
         the linking of the transaction information comprises linking an order ID, which is generated when an item is selected at the first point-of-sale terminal, with another order ID, which is generated when another item is selected at the second point-of-sale terminal, and
   wherein the transaction data further includes drawer session information comprising at least one of a time of a drawer open, an amount, a tender type, or employee or franchisee information, the drawer session information relating to at least one drawer session in which the point-of-sale transactions are conducted at one or more of the plurality of point-of sale terminals.

2. The system of claim 1, wherein the first point-of-sale terminal is configured to store a block of the blockchain ledger relating to a transaction at the second point-of-sale terminal connected via the computing network.

3. The system of claim 1, wherein the message comprises a terminal identifier.

4. The system of claim 1, wherein the message comprises a unique blockchain identifier.

5. The system of claim 1, wherein the transaction data includes data of multiple sales transacted at a plurality of point-of-sale terminals at different facilities connected via the computing network.

6. The system of claim 1, wherein the memory is configured to store the transaction data relating to the at least one drawer session in a local block, and to permit a user to access the local block data to recover the blockchain ledger from a time of a connectivity failure.

7. The system of claim 1, wherein the first point-of-sale terminal is configured to permit evaluation of connectivity periodically and initiate a backup protocol when a lack of connectivity persists for a predetermined time period.

8. The system of claim 1, wherein the initial block is at the start of the day.

9. The system of claim 1, wherein the order ID and the another order ID are linked when the another item is selected at the second point-of-sale terminal.

10. The system of claim 1, wherein the message includes an employee identifier and a number of hours worked by an employee associated with the employee identifier.

11. The system of claim 7, wherein the backup protocol comprises carrying out a block-by-block recovery process for each block in the blockchain.

12. A non-transitory computer readable medium configured to store instructions which, when executed, cause a processor to perform:
- communicating with at least one point-of-sale terminal remotely connected to the processor;
- receiving, from the at least one point-of-sale terminal, a message comprising a unique identifier for a blockchain;
- authenticating the message received from the at least one point-of-sale terminal and recording transaction information for a plurality of transactions in a blockchain ledger, wherein an initial block of the blockchain ledger includes at least part of the transaction information and does not reference a prior block, and wherein the initial block includes information of a first transaction of the plurality of transactions, and a second block of the blockchain ledger includes information of a second transaction of the plurality of transactions;
- synchronizing transaction data between a local cache on the at least one point-of-sale terminal and a remote memory accessible via a cloud computing network, and
- sharing transaction data between the at least one point-of-sale terminal and a second point-of-sale terminal via the remote memory and the cloud computing network, wherein the point-of-sale terminals are connected via the network so as to share a common set of data thereon.

13. The non-transitory computer readable medium of claim 12, wherein the operations further comprise:
- causing the transaction data to be recorded in the local cache prior to transmitting to the cloud computing network, and
- creating a hash associated with the transaction data to serve as a reference for subsequent transactions.

14. The non-transitory computer readable medium of claim 12, wherein synchronizing transaction data between the local cache and the remote memory comprises evaluating transaction data during a period of disconnectivity from a server, and
- wherein during a period of disconnectivity, a first chain is created between connected point-of-sale terminals, and, after a predetermined time, a second chain is created and the first chain is archived in a local cache of each of the connected point-of-sale terminals.

* * * * *